Patented Dec. 24, 1929

1,740,837

UNITED STATES PATENT OFFICE

STANLEY ROBSON, OF AVONMOUTH, ENGLAND

PREPARATION OF SULPHATE OF AMMONIA

No Drawing. Application filed September 8, 1927, Serial No. 218,364, and in Great Britain February 3, 1927.

There are various commercial processes at present in use for the preparation of ammonium sulphate or sulphate of ammonia. A common method is to employ the ammoniacal liquor obtained as a by-product in the carbonization of coal in the manufacture of coal gas and coke, or from blast furnace gases, or from gas manufactured by the Mond process or by the low temperature carbonization processes. The ammoniacal liquor is boiled, with or without the addition of milk of lime, to liberate the ammonia which distils over and is collected in a saturator containing dilute sulphuric acid, sulphate of ammonia being formed.

This salt crystallizes out from the saturator solution without evaporation, when a sufficient concentration is reached, and is removed, further purified by re-crystallization if necessary, washed, and finally dried.

Another method sometimes practised, and known as the direct process, consists in bringing the whole of the gas containing ammonia or its derivatives into direct contact with sulphuric acid in the continuous liquid phase in a saturator or other vessel.

In still another process of comparatively recent application sulphate of ammonia is manufactured from calcium sulphate, ammonia and carbon dioxide. Other processes of less important commercial application exist, wherein other ammonium salts are decomposed by sulphuric acid.

All of these known processes necessarily involve a plurality of steps or stages, mainly due to the prior formation of sulphuric acid and its employment in the continuous liquid phase. An object of my present invention is materially to reduce the number of steps or stages, and the consequent length of time involved in the manufacture of a commercially pure product.

My present invention primarily consists in the production of sulphate of ammonia directly from its constituent radicle groups, ammonia ($NH_3$), sulphur trioxide ($SO_3$) and water ($H_2O$) in the form of gases or of disperse systems whose continuous phase or dispersion medium is gaseous.

In this manner I avoid the intermediate complete condensation and collection of sulphuric acid before mixture with the ammonia or its derivatives. Sulphate of ammonia may be directly obtained by my process and I am enabled to eliminate or substantially reduce the processes of crystallizing, filtering, washing and drying.

One method of operating my invention is to mix the three constituents directly and simultaneously in a suitable pipe, chamber, or other vessel. I may however first cause the ammonia and sulphur trioxide to be mixed and then complete the combination with the aid of water in the form of a spray, steam, vapour, or liquid; or again I may mix the ammonia and the water and complete the combination by the subsequent addition of sulphur trioxide; or the sulphur trioxide and the water may be mixed and the ammonia then added.

In any of these cases the ammonia or/and the sulphur trioxide may be wetted with water or dilute sulphuric acid, ammonium sulphate solution, ammonia solution or other aqueous media and may be diluted with atmospheric or other gases. It should be understood however that it is sulphur trioxide appropriately prepared from sulphur or sulphur-bearing material which is used in my process. It is probably impossible however and indeed unnecessary, to prevent some partial intermediate formation of sulphuric acid or oleum in the principal reaction, and particularly in the wetting of the $SO_3$ in the last of the above described modifications. Such sulphuric acid or oleum is however wholly or mainly in the form of mist and is not condensed and collected in the continuous liquid phase prior to its mixture with the ammonia.

The following are modes of operation in accordance with the present invention. It should be understood, however, that these are given solely for the purpose of illustration and that I do not in any way restrict myself to these examples, but leave myself free to bring about the combination of ammonia ($NH_3$) sulphur trioxide ($SO_3$) and water ($H_2O$) in the form of gases, vapours or mists by any suitable means to form ammonium sulphate either in the solid or liquid state.

*Example 1.*—Gaseous ammonia, a fine atomized spray of water, and sulphur trioxide in the form of converter gas are led into a chamber connected to a bag house or other suitable collecting device. Sulphate of ammonia is immediately produced. By control of the reactants the sulphate of ammonia produced can be kept dry and substantially neutral, the solid particles being retained in the bag house or other collecting apparatus. If desired, by the addition of excess water, the sulphate of ammonia can be produced as a solution of any desired strength. The gases issuing from the chamber can be scrubbed in any suitable manner.

*Example 2.*—Gaseous ammonia is mixed with the required amount of sulphur trioxide in the form of converter gas and led into a chamber. To this mixture a fine spray of water is admitted. Sulphate of ammonia is immediately produced and led to an electrostatic depositor, bag house or other suitable collecting apparatus. The gases issuing from the chamber can be scrubbed in any suitable manner.

*Example 3.*—Ammonia liquor having a water content proportional to the desired dilution of the product is sprayed into a chamber to which sulphur trioxide is admitted, the quantities being suitably regulated for the formation of sulphate of ammonia. The gases issuing from the chamber may be scrubbed in any convenient manner.

*Example 4.*—Sulphur trioxide in the form of converter gas is wetted in any suitable manner so as to carry forward the requisite amount of water for the desired final condition of the product. This wetting may be conveniently carried out by bye-passing a certain amount of the gas containing sulphur trioxide through a vessel containing water and sending the remainder of the gas direct to the mixing chamber. By regulation of the relative amounts of wet and dry gas the amount of water carried forward may be controlled. Ammonia gas is also led into the chamber in the proportion required for the reaction. Sulphate of ammonia is immediately produced and led into a bag house or other suitable collecting device. By proper control dry and substantially neutral sulphate of ammonia can be obtained.

What I claim is:

1. A method of directly producing sulphate of ammonia consisting in bringing together ammonia ($NH_3$), sulphur trioxide ($SO_3$) and water ($H_2O$) all in the form of gases, or disperse systems whose continuous phase is gaseous.

2. A method of directly producing sulphate of ammonia as a solid consisting in bringing together ammonia ($NH_3$), sulphur trioxide ($SO_3$) and water ($H_2O$) all in the form of gases, or disperse systems whose continuous phase is gaseous, and passing the mixture through a collecting device to separate the solid sulphate of ammonia.

3. A method of directly producing sulphate of ammonia as a solution of any desired strength consisting in bringing together ammonia ($NH_3$) sulphur trioxide ($SO_3$) and excess water ($H_2O$) all in the form of gases, or disperse systems whose continuous phase is gaseous, the quantity of water being regulated to produce the solution strength required.

4. A method for the direct production of substantially pure sulphate of ammonia consisting in bringing together ammonia, sulphur trioxide produced by the oxidation of sulphur dioxide with the aid of a catalyst and water, all in the form of gases or disperse systems whose continuous phase is gaseous.

5. A method for the direct production in one operation of sulphate of ammonia free from any substantial proportion of sulphite of ammonia, said method consisting in bringing together in a suitable vessel ammonia, sulphur trioxide produced with the aid of a catalyst, together with such proportion of sulphur dioxide as remains unoxidized after passage over the catalyst, and water, all of said reactants being in the form of gases, or disperse systems whose continuous phase is gaseous.

STANLEY ROBSON.